(12) United States Patent
Lee

(10) Patent No.: US 11,808,486 B2
(45) Date of Patent: Nov. 7, 2023

(54) METHOD AND SERVER FOR CONTROLLING WATER HEATER ON BASIS OF ARTIFICIAL INTELLIGENCE LEARNING

(71) Applicant: LG Electronics Inc., Seoul (KR)

(72) Inventor: Eung-Shin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 17/434,574

(22) PCT Filed: Feb. 28, 2019

(86) PCT No.: PCT/KR2019/002447
§ 371 (c)(1),
(2) Date: Aug. 27, 2021

(87) PCT Pub. No.: WO2020/175724
PCT Pub. Date: Sep. 3, 2020

(65) Prior Publication Data
US 2022/0146150 A1      May 12, 2022

(51) Int. Cl.
*F24H 15/45* (2022.01)
*F24H 15/281* (2022.01)
(Continued)

(52) U.S. Cl.
CPC ......... *F24H 15/414* (2022.01); *F24H 15/281* (2022.01); *F24H 15/45* (2022.01); *G05B 13/0265* (2013.01); *H04L 12/2807* (2013.01)

(58) Field of Classification Search
CPC ...... F24H 15/281; F24H 15/414; F24H 15/45; F24H 15/152; F24H 15/156;
(Continued)

(56) References Cited

U.S. PATENT DOCUMENTS

2012/0060771 A1* 3/2012 Brian .................... F24H 9/2007
219/492
2015/0276265 A1* 10/2015 Davari ................. G05B 19/402
700/300
(Continued)

FOREIGN PATENT DOCUMENTS

JP    2000304286    11/2000
JP    2002022278    1/2002
(Continued)

OTHER PUBLICATIONS

Extended European Search Report in European Appln. No. 19916886.5, dated Sep. 12, 2022, 7 pages.

*Primary Examiner* — Kidest Bahta
(74) *Attorney, Agent, or Firm* — Fish & Richardson P.C.

(57) ABSTRACT

The present invention relates to a method of a server for controlling a water heater on the basis of artificial intelligence learning, and a server for controlling a water heater according to one embodiment of the present invention receives operation information related to the water heater from the water heater, receives schedule information of a user controlling the water heater from either a terminal device or a schedule server linked to the terminal device, and uses the schedule information to generate control information for controlling the water heater.

18 Claims, 9 Drawing Sheets

(51) Int. Cl.
   *F24H 15/414*  (2022.01)
   *G05B 13/02*  (2006.01)
   *H04L 12/28*  (2006.01)

(58) Field of Classification Search
   CPC . F24H 15/174; F24H 15/421; G05B 13/0265;
   H04L 12/2807; H04L 12/2818; H04L
   12/282; H04L 12/2825; H04L 12/2829;
   H04L 12/2834; H04L 2012/285; G06N
   20/00; G06N 3/044; G06N 3/045; G06N
   3/08
   See application file for complete search history.

(56) References Cited

U.S. PATENT DOCUMENTS

| | | | |
|---|---|---|---|
| 2015/0322652 A1* | 11/2015 | Mazz | G05D 7/0623 137/583 |
| 2016/0010878 A1* | 1/2016 | Lee | F24D 19/1051 700/300 |
| 2017/0074536 A1 | 3/2017 | Bentz et al. | |
| 2017/0074537 A1 | 3/2017 | Bentz et al. | |
| 2017/0074539 A1 | 3/2017 | Bentz et al. | |
| 2017/0074541 A1 | 3/2017 | Bentz et al. | |
| 2017/0075510 A1 | 3/2017 | Bentz et al. | |
| 2017/0075568 A1 | 3/2017 | Bentz et al. | |
| 2017/0076263 A1 | 3/2017 | Bentz et al. | |
| 2020/0098065 A1 | 3/2020 | Bentz et al. | |

FOREIGN PATENT DOCUMENTS

| | | |
|---|---|---|
| JP | 2007139377 | 6/2007 |
| JP | 2008256270 | 10/2008 |
| JP | 2015-218933 A * | 12/2015 |
| KR | 101160795 | 6/2012 |
| KR | 20140062675 | 5/2014 |

* cited by examiner

METHOD AND SERVER FOR CONTROLLING WATER HEATER ON BASIS OF ARTIFICIAL INTELLIGENCE LEARNING

CROSS-REFERENCE TO RELATED APPLICATIONS

This application is a National Stage application under 35 U.S.C. § 371 of International Application No. PCT/KR2019/002447, filed on Feb. 28, 2019, whose entire disclosures are hereby incorporated by reference.

TECHNICAL FIELD

The present invention is a technology related to a method and server for controlling a water heater on the basis of artificial intelligence learning.

BACKGROUND ART

A water heater increases the temperature of a living space or provides hot water in a bathroom or sink. The water heater generates hot water using various energy sources, such as gas, electricity, and briquettes, and uses the hot water to increase the temperature of the space.

Conventionally, the water heater operates according to a manual method such as a method in which a user sets an operation time in advance or a method in which a user sets the temperature of hot water every time to control the temperature.

However, in the case of setting the operation time in advance, there is a problem in that even when there is no user, the water heater operates, and energy efficiency is lowered. Also, when the operation time set by the user does not correspond to a change in external temperature, it may be inconvenient to use the water heater.

Accordingly, there is a need for a technology for the water heater to perform learning on the basis of the user's past usage pattern and for controlling the operation of the water heater on the basis of learning.

In particular, as members are frequently absent in the house due to an increase in single-person households, an increase in economic activity of family members, etc., the water heater is required to operate according to a changing situation in the household.

In this specification, a water heater control method which meets the above-described requirements will be described below.

DISCLOSURE

Technical Problem

To solve the above-described problems, the present invention is directed to providing a method of warming up a water heater so that the water heater may automatically provide hot water according to a usage time of a user and a server for controlling the water heater.

The present invention is also directed to providing a method of operating a water heater in consideration of whether users of the water heater are absent and a server for controlling the water heater.

The present invention is also directed to providing a method of operating a water heater in consideration of characteristics of a region in which the water heater is disposed and a server for controlling the water heater.

Objects of the present invention are not limited to those described above, and other objects and advantages of the present invention which have not been described will be clearly understood from the following descriptions and become more apparent by embodiments of the present invention. Also, it may be easily understood that the objects and advantages of the present invention may be realized by means stated in the claims and combinations thereof.

Technical Solution

According to an embodiment of present invention, a server for controlling a water heater receives operation information of a water heater from the water heater, receives schedule information of a user who controls the water heater from any one of a terminal device and a schedule server interoperating with the terminal device, and generates control information for controlling the water heater using the schedule information.

According to an embodiment of present invention, the server may perform machine learning on usage time information and temperature information of the water heater included in the operation information and generate follow-up control information for the water heater.

According to an embodiment of present invention, the server may change the control information when the schedule information is changed.

According to an embodiment of present invention, a method of controlling a water heater includes receiving, by a communication unit of a server, operation information of a water heater from the water heater, receiving, by the communication unit, schedule information of a user who controls the water heater from any one of a terminal device and a schedule server interoperating with the terminal device, and generating, by a server control unit of the server, control information for controlling the water heater on the basis of the operation information and the schedule information.

Advantageous Effects

When embodiments of the present invention are applied, it is possible to increase energy efficiency because a server automatically warms up a water heater in consideration of the life pattern of a user who uses the water heater.

When embodiments of the present invention are applied, a server controls a water heater in consideration of the absence of a user who uses the water heater, and thus the water heater can operate in accurate consideration of the user's life pattern.

When embodiments of the present invention are applied, a server controls a water heater in consideration of the temperature or regional usage characteristics of a region in which the water heater is disposed, and thus the water heater can operate in accurate consideration of the geographical characteristics or external temperature of a user.

Effects of the present invention are not limited to those described above, and those of ordinary skill in the art may easily derive various effects of the present invention from a configuration of the present invention.

DETAILED DESCRIPTIONS

Figure 1:
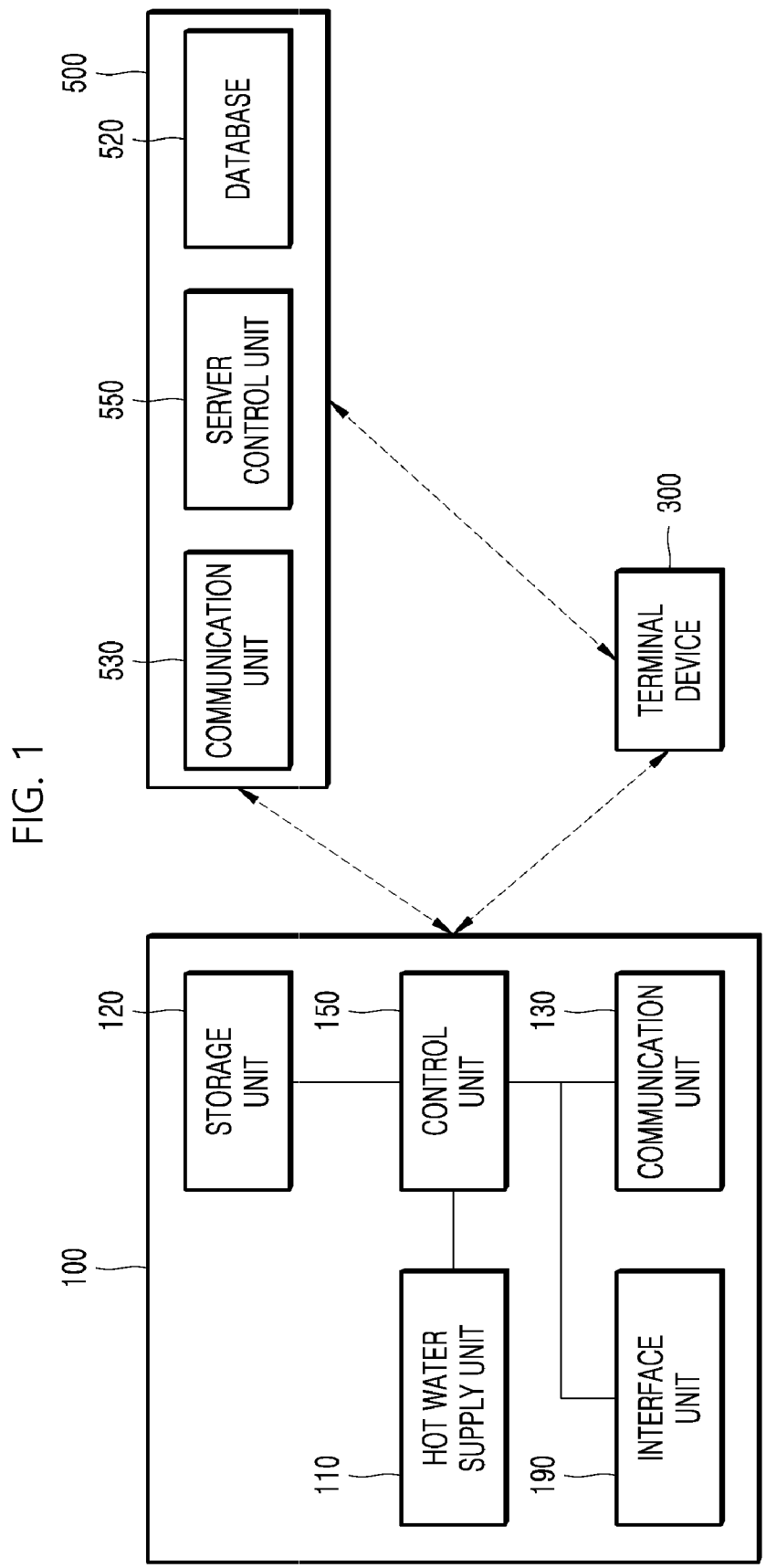
FIG. 1 shows a configuration of a water heater and associated devices according to an embodiment of the present invention.

Hereinafter, embodiments of the present invention will be described in detail with reference to the drawings so that those of ordinary skill in the art to which the present invention pertains may readily implement the present invention. The present invention may be embodied in various different forms and is not limited to the embodiments set forth herein.

To clearly describe the present invention, parts that are irrelevant to the description will be omitted, and the same or similar elements will be designated by the same reference numerals throughout the specification. Also, some embodiments of the present invention will be described in detail with reference to exemplary drawings. In adding reference numerals to elements of each drawing, identical elements are referred to by the same reference numeral as much as possible even when the elements are depicted in different drawings. In describing the present invention, when it is determined that the detailed description of a related known configuration or function may obscure the gist of the present invention, the detailed description may be omitted.

In describing elements of the present invention, terms including first, second, A, B, (a), (b), etc. may be used. The terms are only used for distinguishing an element from other elements and the essence, sequence, order, number, or the like of the elements is not limited by the terms. When it is described that any element is "connected," "coupled," or "linked" to another element, it should be understood that the element may be directly connected or linked to the other element, but still another element may be "interposed" between the elements, or the elements may be "connected" "coupled," or "linked" through another element.

Also, in embodying the present invention, elements may be subdivided for convenience of description. However, the subdivided elements may be implemented in one device or module, or one element may be implemented in multiple devices or modules in a distributed manner.

In this specification, an apparatus which increases a temperature in a space using various materials or an apparatus which provides hot water is referred to as a water heater.

FIG. 1 shows a configuration of a water heater and associated devices according to an embodiment of the present invention.

A water heater 100 maintains a temperature set by a user and provides hot water. The water heater 100 includes a hot water supply unit 110, a storage unit 120, a communication unit 130, a control unit 150, and an interface unit 190.

The communication unit 130 of the water heater 100 transmits information on an operation state of the water heater 100 to a server 500, and the server 500 stores detailed information on the operation of the water heater in a database on the basis of the information on the operation state.

A terminal device 300 is a terminal device carried by the user of a space in which the water heater 100 is installed and includes a device capable of communication such as a cellular phone, a smart phone, and a tablet.

Alternatively, according to an embodiment, the terminal device 300 is a communication device dedicated to a function of controlling the water heater 100.

The water heater 100 stores information on the user's control, the user's settings, etc. in the storage unit 120 and operates. The water heater 100 transmits information generated in an operation process (operation information) to the server 500, and the server 500 calculates a usage pattern from the transmitted information. In particular, in this process, the server 500 may reflect a location or movement pattern of the user, a schedule of the user, or the like in the usage pattern.

The server 500 generates control information on the basis of the usage pattern and transmits the control information to the water heater 100, and the water heater 100 operates on the basis of the control information.

The server 500 includes a communication unit 530, a database 520, and a server control unit 550. When the communication unit 530 receives the operation information of the water heater from the water heater 100, the server control unit 550 stores the operation information in the database 520. Also, the communication unit 530 receives schedule information of the user from the terminal device 300 or a schedule server interoperating with the terminal device 300. The server control unit 550 stores the schedule information in the database 520. Since the database 520 stores the operation information and the schedule information, the server control unit 550 may generate control information based on big data.

The communication unit 530 receives the operation information of the water heater 100 from the water heater 100 and receives the schedule information of the user who controls the water heater 100 from any one of the terminal device 300 and the schedule server (450 of FIG. 9) interoperating with the terminal device 300.

The server control unit 550 generates control information for controlling the water heater 100 on the basis of the schedule information and operation information received by the communication unit 530. The control information is transmitted to the water heater 100 and causes the water heater 100 to operate. According to an embodiment, the control information includes a start time at which the water heater 100 starts operating and a warm-up start time corresponding to the start time. Also, the control information includes a setting value for a temperature of the water heater 100, a setting value for an operation mode of the water heater 100, and the like.

When the configuration of the water heater, server, and terminal device of FIG. 1 is used, it is possible to warm up the water heater so that the water heater may automatically provide hot water at the user's usage time.

Also, when the configuration of FIG. 1 is used, the server can operate the water heater in consideration of whether users of the water heater are absent. Also, the server can operate the water heater in consideration of characteristics of a region in which the water heater is disposed.

Figure 2:
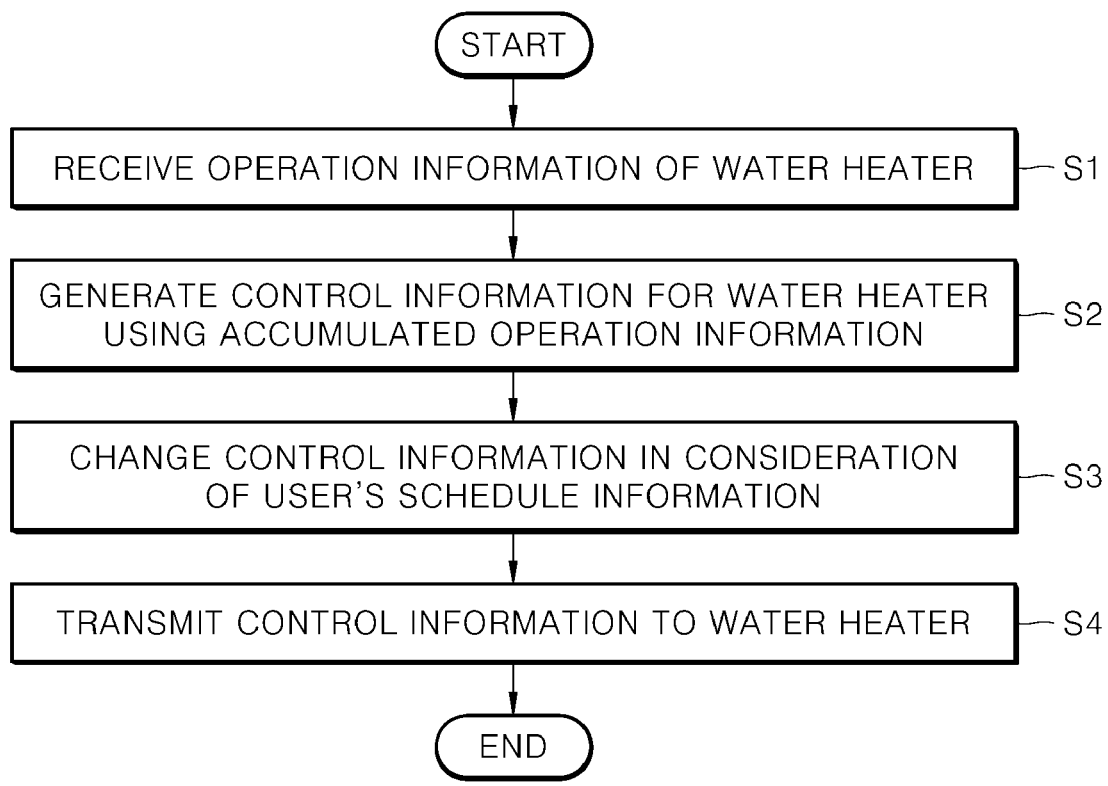
FIG. 2 illustrates a process in which a server operates according to an embodiment of the present invention.

FIG. 2 illustrates a process in which a server operates according to an embodiment of the present invention. The server 500 receives operation information from the water heater 100 (S1). The water heater 100 periodically transmits information, such as a day of the week and a time that the water heater is used, an operation mode of the water heater at the time or a change in the operation mode, and the temperature, to the server 500 using a mobile communication module, a Wi-Fi communication module, or the like.

In particular, the operation information includes information on a time and a temperature at which the water heater 100 operates and mode information indicating in which mode the water heater operates. Also, the operation information includes hot water amount information about how much hot water the water heater uses. In addition, the operation information includes various pieces of information that may be set in the water heater 100 by the user. The operation information includes information on a space to which the water heater 100 supplies hot water or provides heating. Information which is set by the user as a reservation is also included in the operation information.

The server 500 cumulatively stores the operation information in the database 520, after then, when the operation information is accumulated for a certain time period, the server 500 generates control information for the water heater (S2). The server control unit 550 of the server 500 calculates control information regarding a time, a temperature, a mode, etc. in which the user will actually use the water heater later using technology such as artificial intelligence, machine learning, and deep learning.

Also, the server control unit 550 of the server 500 may change the generated control information in consideration of schedule information of the user (S3). Alternatively, steps S2 and S3 may be performed simultaneously or in the reverse order. Then, the server 500 transmits the control information to the water heater (S4).

In step S2 or S3, the server control unit 550 may generate control information in consideration of the energy use of the water heater. As an example, the user may turn the water heater on to use the water heater at a temperature of 25 degrees for two hours from 7 pm on Friday evening, turn the water heater off for one hour, and then turn the water heater on again to use the water heater at a temperature of 25 degrees for three hours. In this case, the server control unit 550 may generate control information for high energy efficiency.

For example, the control information generated by the server control unit 550 controls the operation of the water heater as follows. The water heater 100 is controlled to be turned on at 7 pm on Friday and operate at a temperature of 25 degrees for two hours and then is controlled to operate at a very low temperature (19 degrees) for one hour. Subsequently, the water heater 100 may be controlled to operate at 23 degrees for the following one hour and then operate at 25 degrees for two hours.

When the server 500 generates and transmits control information which is the most appropriate for the operation of the water heater to the water heater, it is possible to maximize power saving of the water heater. In particular, when the water heater 100 excessively uses energy due to a wrong usage pattern of the user, the server 500 can reduce energy usage as a result of controlling the water heater 100 while providing heating at an appropriate temperature to the user.

The server control unit 550 of the server 500 may maintain a learning network using artificial intelligence, deep learning, machine learning, and the like. Also, the server control unit 550 inputs the received operation information of the water heater 100 to the learning network which has been trained in advance, and then the communication unit 530 of the server 500 provides output control information for the water heater to the water heater 100.

In this process, to make control information correspond to the usage pattern of the user, the server control unit 550 may use schedule information of the user in connection with the Google Calendar service or a calendar service based on another Internet website. In other words, the server 500 may receive schedule information in connection with a schedule server which provides the Google Calendar service or a calendar service of an external Internet website. Alternatively, the server 500 receives schedule information from the terminal device 300 of the user. The server control unit 550 compares a presence time and an absence time of the user with the control information using the schedule information and changes the control information so that the water heater may operate according to the user's individual schedule.

As a result, the water heater can automatically adjust an operation temperature, an operation time, and an operation mode on the basis of the control information which reflects the usage pattern and schedule information of the user.

Figure 3:
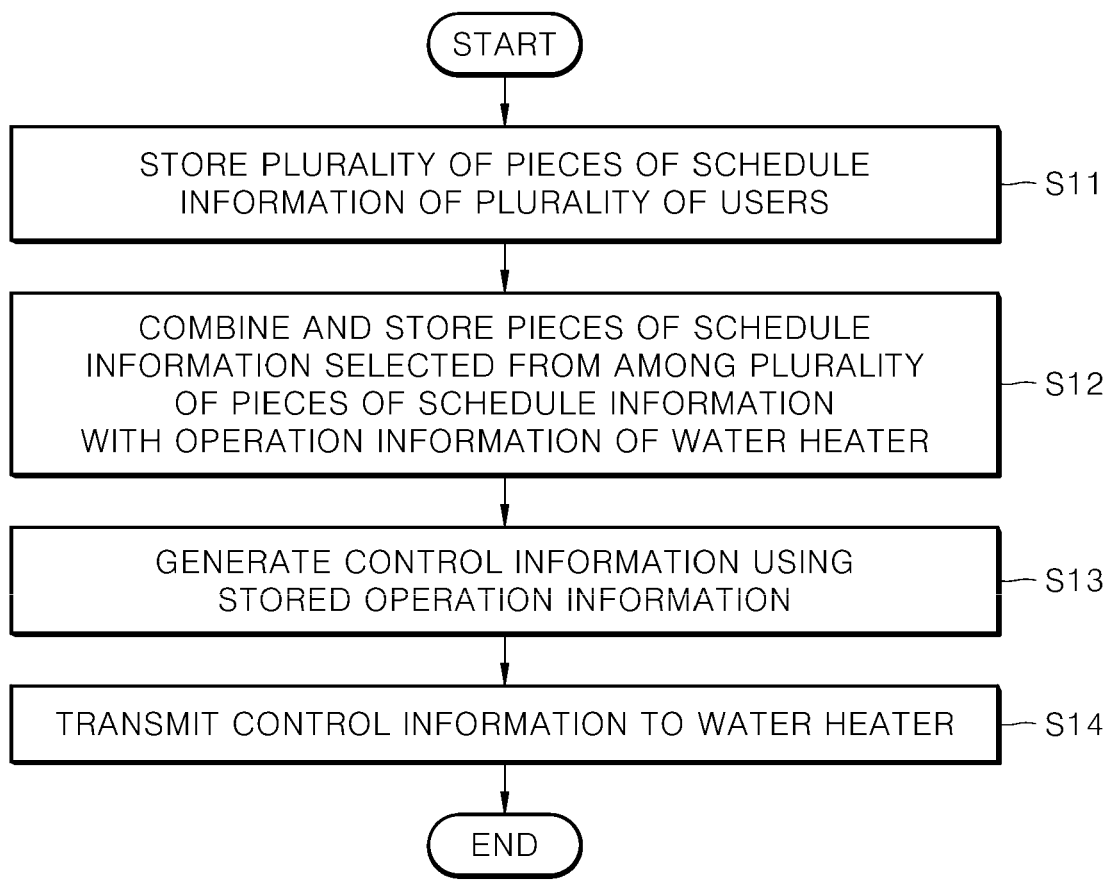
FIG. 3 illustrates a process in which a server detects a usage pattern of a user and generates control information according to an embodiment of the present invention.

FIG. 3 illustrates a process in which a server detects a usage pattern of a user and generates control information according to an embodiment of the present invention.

The server may determine a presence time and an absence time of the user in a space through schedule information of the user. In the database 520, the server 500 stores a plurality of pieces of schedule information of users who use a space in which a corresponding water heater is disposed (S11). When there is one user, the server 500 stores schedule information of the single person in the database. Here, there may be a plurality of pieces of schedule information of the single person. The schedule information includes identification information for identifying the user.

Subsequently, in the database 520, the server 500 combines a piece of schedule information selected from among the stored plurality of pieces of schedule information with operation information of the water heater and stores the selected piece of schedule information in combination with operation information of the water heater (S12). Here, the selected piece of schedule information means a piece of schedule information in which a presence time overlaps a time of the operation information. The presence time in the schedule information means a time in the schedule information in which the user is not absent.

For example, when first schedule information of the user is "13:00 to 14:00 supermarket" and second schedule information of the user is "19:00 to 22:00 movie theatre," the server 500 may store schedule information in which a presence time is "14:00 to 19:00" between the first schedule information and the second schedule information.

According to an embodiment, combining the schedule information with the operation information is including user identification information in the operation information.

Subsequently, the server 500 generates control information using the stored operation information (S13). At this time, the server 500 inputs the above-described operation information and meta-information to a learning module included in the server control unit 550 to generate control information according to an actual usage pattern of the user (S13).

The server 500 transmits the control information to the water heater 100 (S14). An embodiment of a learning module which is used by the server 500 to generate the control information for the water heater 100 is a deep learning module.

Accordingly, using the learning module which has been trained in advance to recognize the user's life pattern, the server 500 generates water heater control information on the basis of information on a day of the week and a time that a person is present indoors and uses the water heater, a pattern of using hot water (the amount, the number of times, etc.), and the schedule information.

The learning module recognizes and learns the user's pattern of using the water heater in his or her life. The learning module may perform learning using a machine learning algorithm. For example, the learning module may use a neural network based on deep learning which is one of the machine learning technologies.

The database 520 of the server 500 may store a plurality of pieces of schedule information of a plurality of users who control the water heater. Then, the server control unit 550 selects one or more of the plurality of pieces of schedule information and combines and stores the selected pieces of schedule information with the operation information in the database. Here, the selected pieces of schedule information mean pieces of schedule information in which a presence time overlaps a time of the operation information.

For example, when there are three users, two of the users may have outside appointments at 5 pm to 9 pm and only one user A may have no scheduled appointments. In this case, all their schedule information is stored in the database 520 so that the server 500 may identify the circumstances.

When the water heater 100 operates by manual control at 6 pm, the server 500 determines that the user A who has no scheduled appointments has operated the water heater 100. The server 500 may store information on the user A and operation information of the water heater 100 in the database 520 and generate user-customized control information.

Table 1 below shows operation information regarding hot water usage of users A and B. When operation information is accumulated as shown in Table 1, the server 500 may generate control information for each user.

TABLE 1

| StartTime | EndTime | Temp | User |
|---|---|---|---|
| 18:32 | 19:03 | 45 | A |
| 10:05 | 12:23 | 55 | B |

In the embodiments of FIGS. 2 and 3, the server control unit 550 may cumulatively store operation information for each day of the week. The server control unit 550 calculates a warm-up time of the water heater 100 on the basis of repeated time information among pieces of operation information which are stored for N or more weeks (e.g., two weeks, three weeks, or four weeks, N is a number equal to or greater than two). The warm-up time may be inversely calculated on the basis of a usage start time and a temperature of the water heater 100 estimated by the server control unit 550. Also, the server control unit 550 may calculate the warm-up time in consideration of a temperature in a region in which the water heater 100 is installed.

According to an embodiment, in a region with temperatures of 30 degrees or above in summer, it is possible that the temperature of water in a water heater has already risen, and the user is very likely to use hot water at a lower temperature. Accordingly, the server control unit 550 sets a short warm-up time.

On the contrary, in a region with temperatures of −10 degrees or below in winter, it is possible that the temperature of water in a water heater is very low, and the user is very likely to use hot water at a high temperature. Accordingly, the server control unit 550 sets a long warm-up time. When the warn-up time is calculated, the server control unit 550 generates control information including a warm-up time for each day of the week.

Figure 4:
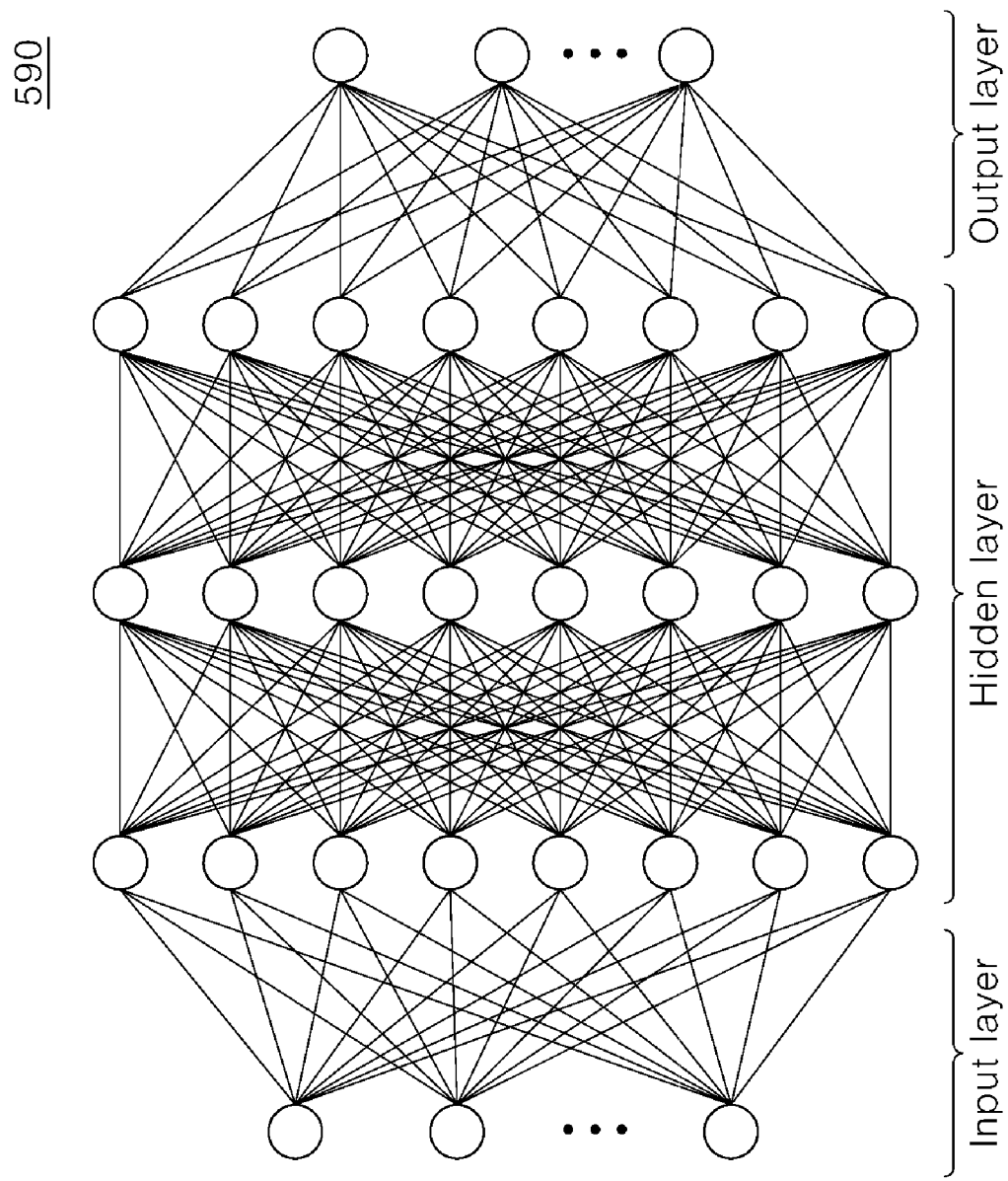
FIG. 4 shows a configuration of a learning module built in a server according to an embodiment of the present invention.

FIG. 4 shows a configuration of a learning module built in a server according to an embodiment of the present invention. FIG. 4 shows a learning module 590 with a deep learning architecture. The deep learning architecture may include an artificial neural network (ANN). For example, the deep learning architecture may be configured as a deep neural network (DNN) such as a convolutional neural network (CNN), a recurrent neural network (RNN), or a deep belief network (DBN).

The learning module 590 may include an input layer, hidden layers, and an output layer. Each layer includes a plurality of nodes, and each layer is connected to a next layer. Nodes between the adjacent layers may be connected to each other with weights.

At first, the learning module 590 repeats a learning process of adjusting an arrangement or setting of edges and nodes of the hidden layers by inputting pre-calculated values to the input layer and the output layer. When the learning is completed, the learning module inputs a certain input factor to the input layer and outputs control information for a water heater from the output layer.

For example, information related to the operation or schedule information of the water heater may be input to the input layer. As an example, the learning module 590 inputs information on a time, a temperature, etc. at which the water heater is used to the input layer. Alternatively, the learning module 590 inputs schedule information to the input layer.

More specifically, the learning module 590 inputs "operation mode change," "10-minute course/usage history," "schedule information," "final mode/temperature setting," "regional/seasonal setting temperature," etc. to the input layer.

A factor output from the output layer includes control information required for controlling the water heater. When the learning of the learning module 590 is completed through the learning process of adjusting the arrangement or setting of the edges and nodes of the intermediate hidden layers, the learning module 590 calculates control information for the water heater by reflecting the input information in the configuration and setting of the nodes/edges of the hidden layers.

For example, "automatic setting/change of water heater heating time," "automatic setting/change of hot water temperature" may be output from the output layer and may constitute control information. Alternatively, a warm-up time corresponding to the heating time may be output from the output layer.

The learning module 590 may be abstracted into higher-level features by moving to the next layer. Each node included in the learning module 590 may operate on the basis of an activation model, and an output value corresponding to an input value may be determined according to the activation model. In FIG. 4, the input layer is defined as the lowest level, and the output layer is defined as the highest level.

An output value of an arbitrary node, for example, a low-level feature (a level close to the input layer), may be input to a next layer connected to the node, for example, a node with an intermediate-level feature. A node in the next layer, for example, a node with an intermediate-level feature, may receive values output from a plurality of nodes with a low-level feature.

Here, received values of each node may be values obtained by applying weights to output values of nodes in a previous layer. A weight may denote the intensity of a connection between nodes. Also, a deep learning process may be considered a process of detecting appropriate weights. Further, a deep learning process is a process of detecting appropriate bias. Bias denotes providing a value biased in a specific direction between nodes.

Meanwhile, an output value of an arbitrary node, for example, an intermediate-level feature, may be input to a next layer connected to the node, for example, a node with a high-level feature (a level close to the output layer). A node in the next layer, for example, a node with a high-level feature, may receive values output from a plurality of nodes with an intermediate-level feature.

The learning module 590 may extract feature information corresponding to each level using a trained layer corresponding to the level. The ANN may perform sequential abstraction and output control information for the water heater using feature information of the highest level.

Various architectures may be used as the deep learning architecture of the learning module 590 of FIG. 4. For example, the deep learning architecture of the learning module 590 may be a CNN, an RNN, a DBN, or the like.

An RNN is frequently used in natural language processing and the like. An RNN is an architecture effective for processing time-series data which varies over time, and the ANN architecture may be built by stacking a layer every moment.

A DBN is a deep learning architecture built by stacking restricted Boltzmann machines (RBMs), which correspond to a deep learning technique, in multiple layers. When a certain number of layers are obtained by repeating RBM learning, a DBN with the corresponding number of layers may be built.

A CNN is an architecture frequently used, especially, in the object recognition field. A CNN is modeled after the functionality of the human brain on the basis of an assumption that when a person recognizes an object, the brain extracts basic features of the object, performs complex calculation, and then recognizes the object on the basis of the result.

According to an embodiment, the learning module 590 of FIG. 4 is a software module and may be installed in the server control unit 550 after being sufficiently trained.

Figure 5:
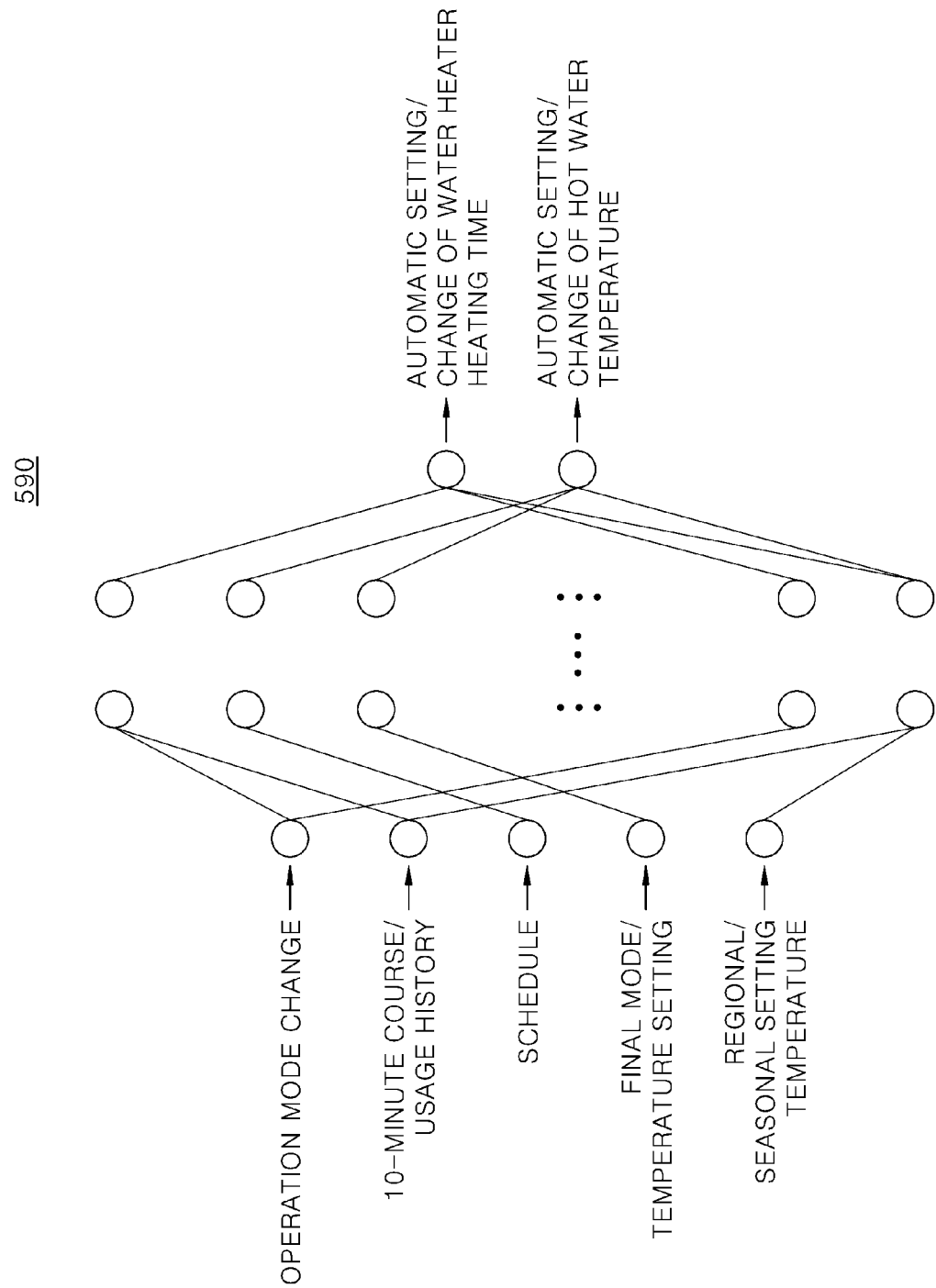
FIG. 5 shows an operating process of a deep learning module according to an embodiment of the present invention.

FIG. 5 shows an operating process of a deep learning module according to an embodiment of the present invention. The learning module 590 receives five types of information and then outputs two types of information.

The received information may be diversely determined. The learning module 590 receives information about a change in the operation mode of the water heater, information on a 10-minute course or usage history, schedule information, information on a final mode or temperature setting, and a set temperature according to a region in which the water heater is installed or the season. Then, according to results of previous learning, the learning module 590 outputs information for automatically setting or changing a water heater heating time and information for automatically setting or changing a hot water temperature.

The learning module 590 may determine a characteristic of a user's past hot water usage using the past schedule information and generate water heater control information according to the characteristic. Also, the learning module 590 may determine whether the user is absent using future schedule information of the user and generate control information for hot water. For example, the learning module 590 adjusts a hot water heating time in consideration of the user's time of returning home when the user is absent.

When the learning module 590 is used, the server 500 receives the user's usage time and history of setting the water heater temperature and schedule information (a calendar schedule). As a result, the server 500 provides control information for automatically setting an operation time and temperature of the water heater in consideration of a specific usage environment of a space in which the water heater is installed to the water heater 100. Then, the water heater 100 may automatically provide hot water and heating in a customized manner using the control information calculated on the basis of learning.

In particular, the server may use the future schedule information and thus can optimally adjust an operation time and a temperature of the water heater and recommend the optimal temperature. As shown in FIG. 5, when temperature information according to the region in which water heater is installed or the season is input, the server 500 may improve the accuracy of control information.

When embodiments of the present invention are applied, the server 500 generates control information for the water heater using previous operation information of the water heater and past/present/future schedule information of the user.

In particular, the operation information includes a time and a temperature at which the user uses the water heater, and this information is cumulatively stored in the database 520 of the server 500. Then, the stored information is input to the learning module 590. The learning module 590 generates control information for the water heater reflecting results of estimating a time and a temperature at which the user mainly uses the water heater. The control information includes information on a period in which the water heater is operated, information for automatically adjusting the temperature, and the like.

The schedule information may also be received from various schedule servers which provide calendar services. Alternatively, the terminal device 300 of the user may transmit the schedule information to the server 500.

The server may selectively input only some of the input values of FIGS. 4 and 5 to the learning module 590.

Figure 6:
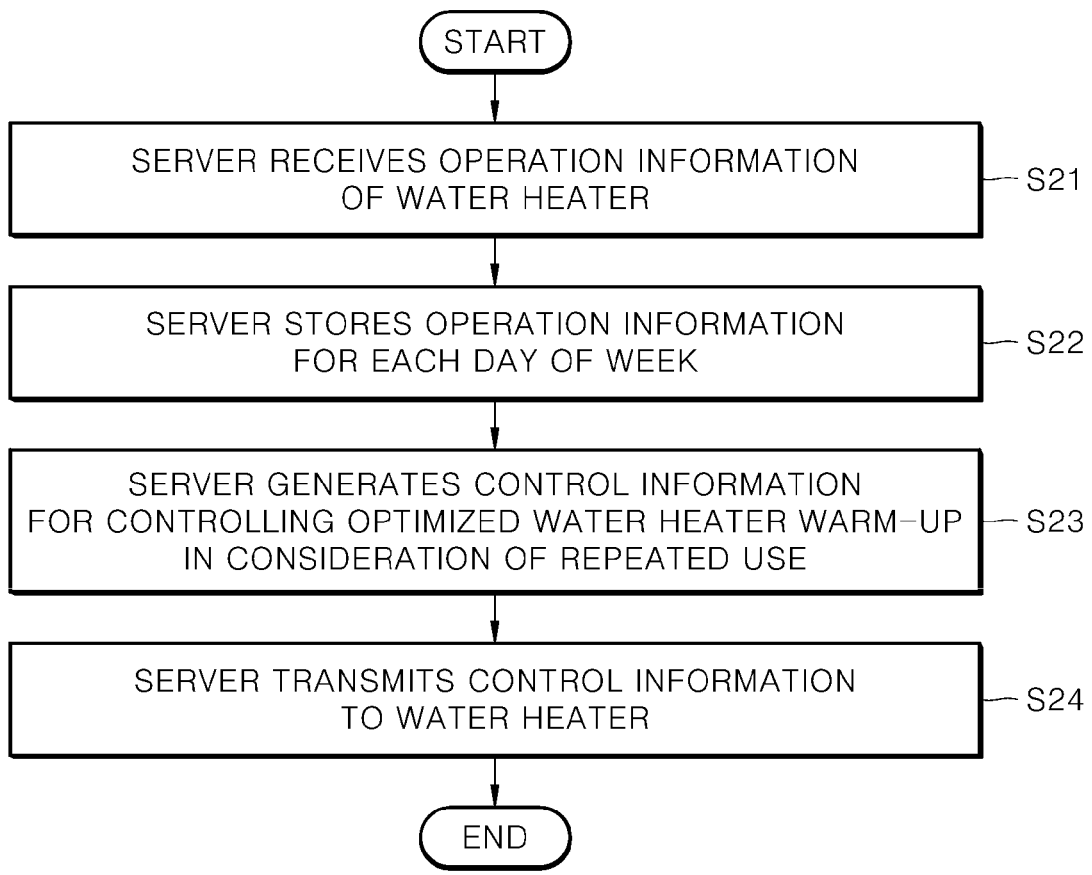
FIG. 6 illustrates a process of generating control information on the basis of a user's past water heater usage pattern according to an embodiment of the present invention.

FIG. 6 illustrates a process of generating control information on the basis of a user's past water heater usage pattern according to an embodiment of the present invention. The server 500 receives hot water operation information from the water heater 100 (S21). Then, the server 500 stores the hot water operation information in the database 520 for each day of the week for a certain time period (S22).

The server 500 generates control information using the operation information cumulatively stored for N weeks (N is a natural number greater than or equal to 2) (S23). When the water heater has been repeatedly used (2*N/3) times or more between 7 pm to 9 pm on specific days of the week (Monday to Friday) for N weeks, the server 500 generates control information optimized for using the water heater between 7 pm to 9 pm on the days of the week (Monday to Friday) (S23). Then, the server 500 transmits the control information to the water heater 100.

According to an embodiment, the server 500 generates control information for controlling warm-up of the water heater so that the water heater may start warm up three hours before use of the water heater (7 pm to 9 pm) on Monday to Friday. According to the control information, the water heater 100 operates at the optimum temperature at the time at which the user may use the water heater 100.

The control information generated by the server 500 prevents a problem of warming up the water heater when hot water is not used and causes the water heater 100 to operate on the basis of the time point (7 pm) at which hot water is estimated to be used.

Likewise, the server 500 may determine that the user is absent on Saturday for consecutive three weeks. The server 500 receives operation information including that the mode of the water heater 100 is changed to a leave mode on Saturday from the water heater 100. Then, the server 500 determines that the water heater 100 does not provide hot water on Saturday for three weeks.

The server 500 generates the control information "Saturday—hot water is not used" using accumulated operation information (Saturday—leave mode). When the server 500 transmits the control information to the water heater 100, the interface unit 190 of the water heater 100 outputs the control information as a notification message. For example, the interface unit 190 outputs "You don't use hot water on Saturday" in voice or text. The user identifies the output message and may change or cancel application of the control information.

The water heater 100 may operate in consideration of the user's past water heater usage pattern and preferences such as a set temperature and a usage time. The server 500 stores a usage pattern history of each time section as operation information. Also, the server 500 generates control information appropriate for the usage pattern and transmits the usage pattern to the water heater 100.

Figure 7:
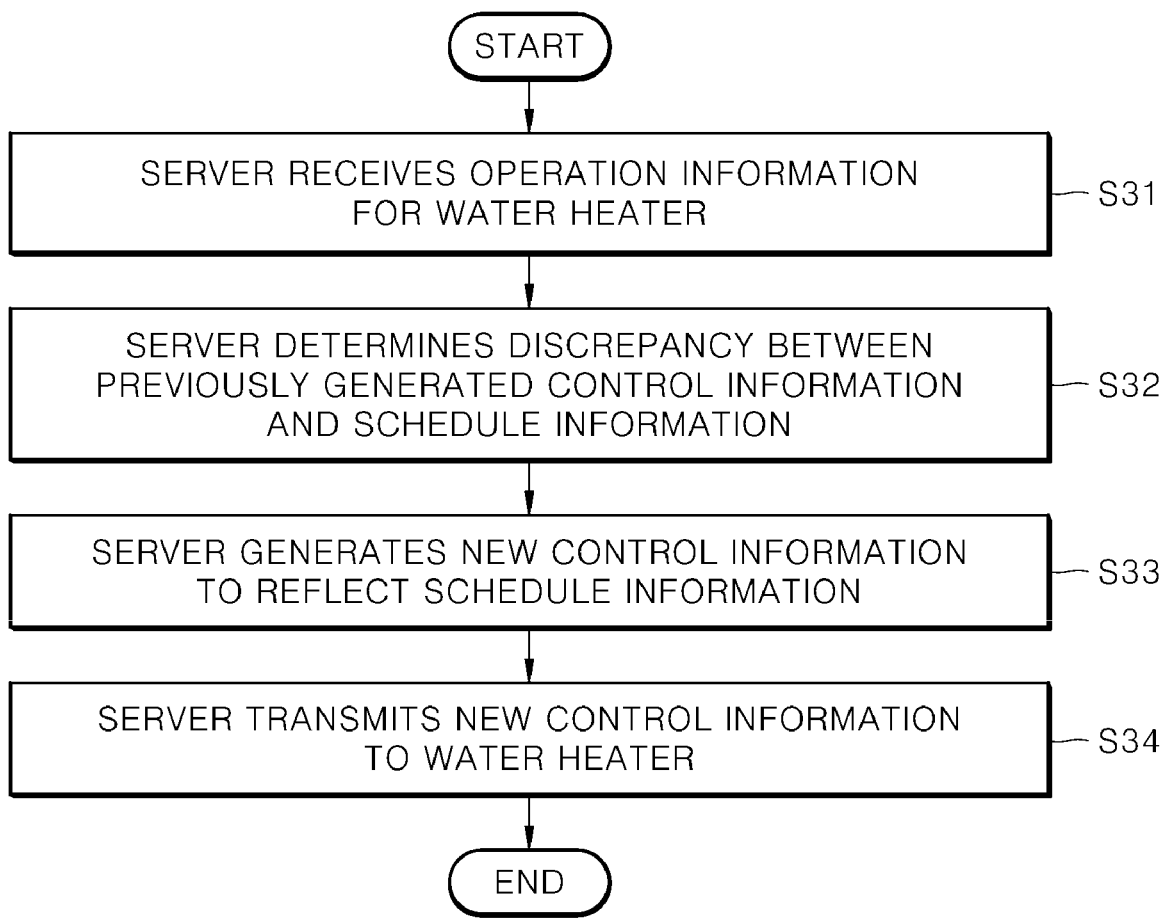
FIG. 7 illustrates a process of generating control information on the basis of a user's schedule information according to an embodiment of the present invention.

FIG. 7 illustrates a process of generating control information on the basis of a user's schedule information according to an embodiment of the present invention. As shown in FIG. 6, the server 500 has already generated control information for warming up the water heater from 4 pm on Monday to Friday and transmitted the control information to the water heater 100.

The server 500 receives schedule information of the user (S31). The server 500 determines a discrepancy between the previously generated control information and the received schedule information (S32). The discrepancy denotes an overlap between a time in which the water heater 100 will operate according to the control information and a time in which the user will be absent according to the schedule information. According to an embodiment, such a discrepancy corresponds to a case in which the water heater 100 may unnecessarily operate because the user is outside the house when the water heater 100 operates.

For example, schedule information provided by a calendar/schedule service of a portal website, Google, or the like includes an external schedule (a schedule for absence in the space in which the water heater is installed) from 6 pm to 10 pm on Thursday. The server 500 generates new control information to reflect the schedule information (S33).

According to an embodiment, the server 500 generates exceptional control information. The exceptional control information is control information for canceling warm-up of the water heater in the afternoon on Thursday.

Then, the server 500 transmits the new control information (the exceptional control information) to the water heater 100 (S34).

The water heater 100 outputs the received new control information "Today, you are absent due to a business trip. Do you want to delay warming up the water heater to an optimal temperature until tomorrow?" in voice or text through the interface unit 190. The user identifies the output message and may change or cancel application of the control information. When the control information is applied, the water heater 100 starts warming up at 4 pm the next day (Friday).

FIG. 7 shows a process of changing or newly generating control information in connection with schedule information of a user. The server 500 may store control information which is repeated at all times and temporary/exceptional control information in the database 520, and when schedule information of the user is changed, the server 500 may generate new control information in consideration of the changed schedule information.

The server 500 compares a time in which the water heater is scheduled to operate according to the control information and schedule information for absence and generates control information for adjusting an operation time (a heating time or a warm-up time) of the water heater. Alternatively, the server 500 generates control information for recommending a new time. Alternatively, the server 500 generates control information for setting a new time.

Even after the server 500 generates control information for controlling the operation of the water heater 100 to suit the user's usage pattern as shown in FIG. 6, the server 500 may receive sudden schedule information different from the usage pattern. The server 500 may change the control information indicating an operation time or an operation mode of the water heater in consideration of the received schedule information.

Figure 8:
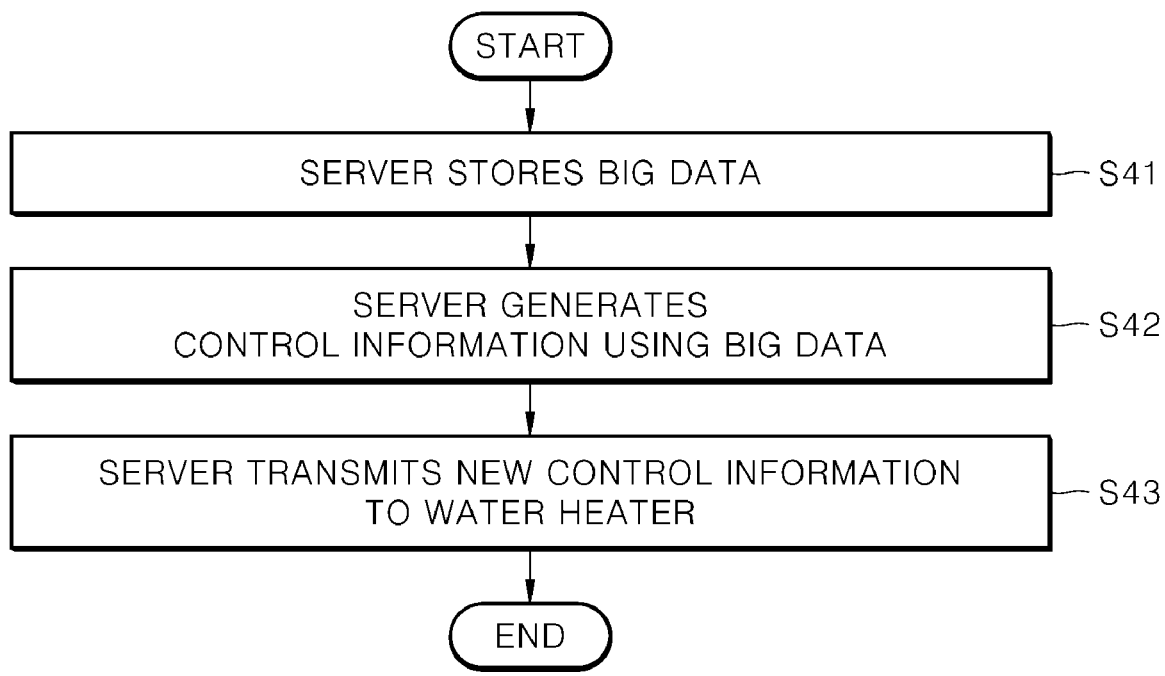
FIG. 8 illustrates a process of generating control information depending on a region in which a water heater is installed or the season on the basis of big data according to an embodiment of the present invention.

FIG. 8 illustrates a process of generating control information depending on a region in which a water heater is installed or the season on the basis of big data according to an embodiment of the present invention.

The server 500 stores big data about the region in which the water heater 100 is installed. For example, the server 500 stores big data about hot water usage patterns of the region in the database 520. The server 500 may store optimal courses or options according to the sex/age and the like of users as big data.

Alternatively, in the database 520, the server 500 stores big data about temperature changes or seasonal temperature changes of an area including a region or a country in which the water heater 100 is installed (S41). The server 500 generates control information using the big data including the region or country or the season or external temperature and characteristics of the users (S42).

As an example of the generated control information, when the water heater is installed in Texas, USA and the current season is summer, the control information includes the messages "Do you want to set the water heater to a hot water temperature for summer (30 degrees)? (optional)" and "water heater temperature: 30 degrees."

When the water heater is installed in New York and the current season is winter, big data indicating a cold wave may be stored. In this case, the control information includes the messages "There is a cold wave forecast for the region. Do you want to set a hot water temperature to 45 degrees? (optional)" and "water heater temperature: 45 degrees."

The server 500 transmits the new control information to the water heater 100 (S43). The users may identify the displayed message and select an option.

During the process of FIG. 8, the user may identify the message through the water heater 100. Alternatively, the user may identify the message through the terminal device 300.

In other words, before the communication unit 530 of the server 500 transmits the new control information to the water heater 100, the server 500 transmits the control information for the water heater to the terminal device 300 first. Then, the user may identify the message displayed on the terminal device 300 and request application of the control information for the water heater by pressing "OK" button, "Confirm" button, or the like.

The communication unit 530 of the server 500 receives a message for requesting application of the control information for the water heater from the terminal device 300 and then transmits the control information to the water heater. As a result, the user can identify that the control information for the water heater 100 is changed or newly applied anywhere.

Figure 9:
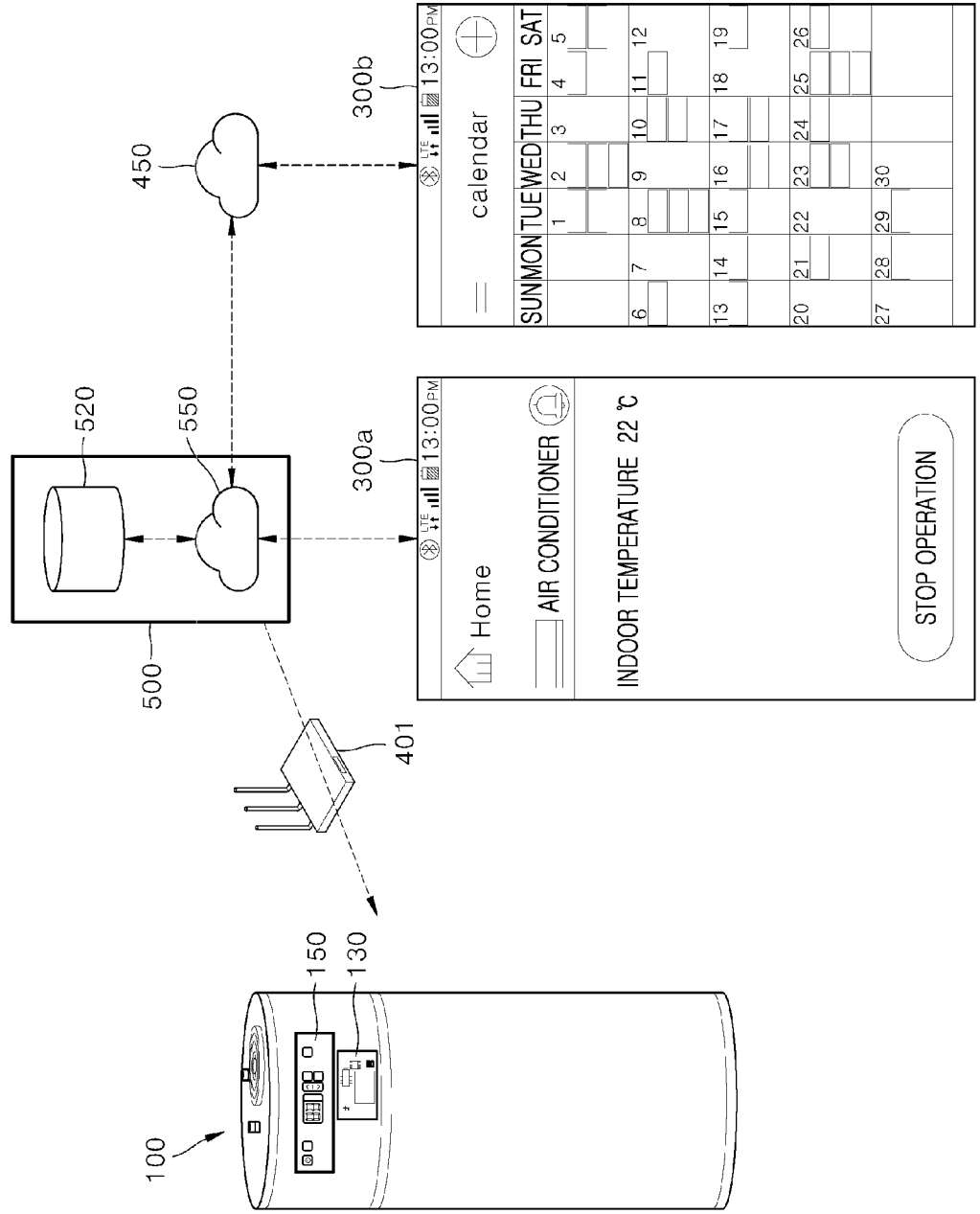
FIG. 9 shows an exemplary configuration of a water heater system according to an embodiment of the present invention.

FIG. 9 shows an exemplary configuration of a water heater system according to an embodiment of the present invention. FIG. 9 shows a process in which various communication media devices, a terminal device, a schedule server, etc. interact with each other during a process in which the control unit 150 and the communication unit 130 in the water heater transmit operation information of the water heater 100 to the server 500 and receive control information from the server. The control unit 150 of the water heater 100 controls the water heater 100 using control information provided by the server 500.

The communication unit 130 transmits operation information to the server 500 and receives control information from the server 500 via a router 401. A terminal device 300*a* may identify current operation information of the water heater 100 and control information which will be applied when the water heater 100 operates later. The operation information includes a current temperature or operation mode of the water heater 100.

Also, the server 500 continuously and cumulatively stores the operation information of the water heater 100 in the database 520. The control unit 550 of the server 500 generates control information appropriate for a pattern of the user on the basis of the operation information. In particular, in this process, the server 500 may generate control information using schedule information stored in a schedule server 450.

The schedule server 450 may update or add schedule information by communicating with a terminal device 300*b*. The server 500 may determine an absence time of the user using the schedule information of the schedule server 450 and generate control information on the basis of the absence time. When the schedule information is changed, the server control unit 550 of the server 500 may change the control information again.

The two terminal devices 300*a* and 300*b* show examples of operations of one device. Accordingly, one terminal device may identify the operation information of the water heater 100 like the terminal device 300*a* and add/change the schedule information like the terminal device 300*b*. An application running on the terminal device 300*a* may directly control or monitor the water heater 100. An application running on the terminal device 300*b* may add or change schedule information.

Therefore, the server 500 estimates the user's commuting time, absence time, or presence time in advance and generates control information for controlling the water heater 100 according to the estimated time. The generated control information may indicate an automatic warm-up function of the water heater 100. The server 500 transmits a message for proposing a warm-up time to the terminal device 300, and when the user confirms the message, the server 500 transmits control information for operating the water heater 100 at the proposed warm-up time to the water heater 100.

As a result, the water heater 100 may set an optimal automatic hot water temperature on the basis of the user's pattern history of using the water heater 100 and environmental factors of a space/region in which the water heater 100 is installed and may automatically perform a warm-up operation.

Also, the water heater 100 may adjust a water heater temperature according to the user's schedule. Alternatively, the water heater 100/the terminal device 300 outputs information on a recommended hot water temperature so that the user may identify the information. As a result, the server 500 may control the water heater 100 so that the water heater 100 may operate in a power saving mode according to the user's pattern.

According to a conventional method of controlling the temperature of a water heater, a water heater is only maintained at the same temperature. On the other hand, according to an embodiment of the present invention, the server 500 stores operation information of the water heater 100 and schedule information in the database 520. The server 500 generates control information for automatically adjusting a hot water temperature by day of the week and hour according to user-specific hot water temperatures and hot water usage patterns using the stored information.

In particular, the server 500 can determine the user's absence time, circumstances, living area, etc. using the user's schedule information without a human body detection device.

Therefore, when the water heater 100 operates with the control information generated by the server 500, the water heater 100 adjusts a water heater operation time and temperature according to a time at which the user is actually present. Accordingly, the water heater 100 can automatically set an optimal hot water temperature and save energy. Also, since the water heater 100 continuously transmits operation information to the server 500, the user's changed life pattern/area information is also transmitted to the server 500 as operation information so that the server 500 may generate new control information.

The operation information transmitted by the water heater 100 to the server 500 includes a water heater usage time, a hot water temperature, the amount of hot water, and the like. The server 500 receives schedule information including detailed descriptions and times of a schedule, such as dining together/business trip/vacation, from the terminal device 300 or the schedule server 450.

In particular, operation information accumulated in units of weeks and days of the week reflects the user's pattern of using the water heater 100, and thus the server 500 may generate control information which proposes an optimal hot water course on the basis of big data collected from a plurality of water heaters 100. The generated control information allows automatic operation of the water heater 100.

In other words, when embodiments of the present invention are applied, the server automatically warms up the water heater in consideration of a life pattern of a user who uses the water heater, and thus it is possible to increase energy efficiency. Also, when embodiments of the present invention are applied, the server controls the water heater in consideration of the absence of a user who uses the water heater, and thus the water heater can operate in accurate consideration of the user's life pattern. Further, when embodiments of the present invention are applied, a server controls a water heater in consideration of the temperature or regional usage characteristics of a region in which the water heater is disposed, and thus the water heater can operate in accurate consideration of the geographical characteristics or external temperature of a user.

Although all elements constituting embodiments of the present invention have been described as being combined together or to operate in combination, the present invention is not necessarily limited to these embodiments, and one or more of all the elements may be selectively combined to operate within the scope of the present invention. Also, all the elements may be separately implemented as independent pieces of hardware, but all or some of the elements may be selectively combined and implemented as a computer program having a program module which executes some or all functions combined from one or more pieces of hardware. Code and code segments constituting the computer program may be readily inferred by those of ordinary skill in the technical field of the present invention. This computer program is stored in a computer-readable medium and read and executed by a computer so that embodiments of the present invention may be implemented. Storage media of the computer program include storage media including a magnetic recording medium, an optical recording medium, and a semiconductor recording device. Also, the computer program for implementing embodiments of the present invention includes a program module which is transmitted in real time through an external device.

Although the present invention has been described above with reference to the embodiments, various modifications or alterations can be made by those of ordinary skill in the art. Therefore, these modifications or alterations may be construed as being within the spirit of the present invention without departing from the scope of the present invention.

What is claimed is:

1. A server system for controlling and warming up a water heater, the server system comprising:
   a database that stores a plurality of user schedules for a plurality of users of the water heater; and
   a server controller that:
     receives, from the water heater, operation information of the water heater;
     selects one or more user schedules from the plurality of user schedules stored at the database, the selected one or more user schedules (i) being associated with the received operation information and (ii) including a user presence time that overlaps with an operation time of the water heater;
     generates, based on the received operation information and the selected one or more user schedules, control information usable to control the water heater;
     stores the operation information for each day over a plurality of weeks;
     calculates, based on (i) a time pattern in the operation information stored for the plurality of weeks and (ii) temperature in a region in which the water heater is installed, a warm-up time of the water heater for each day of a week; and
     generates the control information that includes the warm-up time for each day of the week.

2. The server system of claim 1, wherein the server controller is configured to: receive, from at least one user terminal or from a schedule server, the plurality of user schedules, wherein the schedule server is configured to communicate with the at least one user terminal.

3. The server system of claim 1, wherein the user presence time represents a time that a user is present at a space for which the water heater is operated.

4. The server system of claim 1, wherein the water heater is configured to be controlled by the plurality of users.

5. The server system of claim 1, wherein the operation information includes (i) an operation time of the water heater and (ii) a water temperature of the water heater.

6. The server system of claim 5, wherein the server controller is configured to:
   determine patterns in (i) the operation time of the water heater and (ii) the water temperature of the water heater; and
   generate, based on the patterns, adjusted control information usable to control the water heater.

7. The server system of claim 5, wherein the server controller is configured to:
   perform machine learning on (i) the operation time of the water heater and (ii) the water temperature of the water heater; and
   generate, based on the machine learning, adjusted control information usable to control the water heater.

8. The server system of claim 7, wherein the server controller is configured to:
   generate, based on the selected one or more user schedules being changed, adjusted control information usable to control the water heater.

9. The server system of claim 1, wherein the server controller is configured to:
   transmit, to a user terminal, the control information usable to control the water heater;
   receive, from the user terminal, a message that requests operation of the water heater based on the control information; and
   transmit, to the water heater, the control information.

10. A method for controlling and warming up a water heater, comprising:
    storing, at a database, a plurality of user schedules for a plurality of users of the water heater;
    receiving, at a server system and from the water heater, operation information of the water heater;
    selecting, at the server system, one or more user schedules from the plurality of user schedules stored at the database, the selected one or more user schedules (i) being associated with the received operation information and (ii) including a user presence time that overlaps with an operation time of the water heater;
    generating, at the server system and based on the received operation information and the selected one or more user schedules, control information usable to control the water heater;
    storing, at the server system, the operation information for each day over a plurality of weeks;
    calculating, at the server system and based on (i) a time pattern in the operation information stored for the plurality of weeks and (ii) temperature in a region in which the water heater is installed, a warm-up time of the water heater for each day of a week; and
    generating the control information that includes the warm-up time for each day of the week.

11. The method of claim 10, further comprising:
receiving, from at least one user terminal or from a schedule server, the plurality of user schedules, wherein the schedule server is configured to communicate with the at least one user terminal.

12. The method of claim 10, wherein the user presence time represents a time that a user is present at a space for which the water heater is operated.

13. The method of claim 10, wherein the water heater is configured to be controlled by the plurality of users.

14. The method of claim 10, wherein the operation information includes (i) an operation time of the water heater and (ii) a water temperature of the water heater.

15. The method of claim 14, further comprising:
determining, at the server system, patterns in (i) the operation time of the water heater and (ii) the water temperature of the water heater; and
generating, at the server system and based on the patterns, adjusted control information usable to control the water heater.

16. The method of claim 14, further comprising:
performing, at the server system, machine learning on (i) the operation time of the water heater and (ii) the water temperature of the water heater; and
generating, at the server system and based on the machine learning, adjusted control information usable to control the water heater.

17. The method of claim 16, further comprising:
generating, at the server system and based on the selected one or more user schedules being changed, adjusted control information usable to control the water heater.

18. The method of claim 10, further comprising:
transmitting, from the server system to a user terminal, the control information usable to control the water heater;
receiving, at the server system and from the user terminal, a message that requests operation of the water heater based on the control information; and
transmitting, from the server system to the water heater, the control information.

* * * * *